United States Patent
Agarwal

(10) Patent No.: US 8,215,123 B2
(45) Date of Patent: Jul. 10, 2012

(54) COMPACT GRILLE CABINET FOR ROOM AIR-CONDITIONERS

(76) Inventor: Sanjiv Agarwal, Calcutta (IN)

( * ) Notice: Subject to any disclaimer, the term of this patent is extended or adjusted under 35 U.S.C. 154(b) by 629 days.

(21) Appl. No.: 12/517,807

(22) PCT Filed: Dec. 7, 2007

(86) PCT No.: PCT/IN2007/000570
§ 371 (c)(1),
(2), (4) Date: Jun. 5, 2009

(87) PCT Pub. No.: WO2008/068774
PCT Pub. Date: Jun. 12, 2008

(65) Prior Publication Data
US 2010/0319901 A1    Dec. 23, 2010

(30) Foreign Application Priority Data

Dec. 7, 2006  (IN) .............................. 1316/KOL/06

(51) Int. Cl.
*F25D 23/12* (2006.01)
*F25D 19/02* (2006.01)
*F25B 13/00* (2006.01)
*F17C 13/00* (2006.01)

(52) U.S. Cl. .......... 62/262; 62/324.6; 62/448; 62/457.9

(58) Field of Classification Search .................. 62/262, 62/389, 324.6, 419, 430, 440, 448, 457.9; 165/253
See application file for complete search history.

(56) References Cited

U.S. PATENT DOCUMENTS 4,637,222 A * 1/1987 Fujiwara et al. ................ 62/244
6,347,526 B1 * 2/2002 Ledbetter ....................... 62/237

FOREIGN PATENT DOCUMENTS

| GB | 765 498 A | 1/1957 |
| GB | 2 138 128 A | 10/1984 |
| KR | 2002 0026727 | 4/2002 |

OTHER PUBLICATIONS

International Search Report and the written opinion of the ISA—EPO of Feb. 4, 2008 with International Application PCT/IN2007/000570, published by WIPO on Dec. 6, 2008.

* cited by examiner

*Primary Examiner* — Chen Wen Jiang

(57) ABSTRACT

This invention relates to an improved compact grille cabinet for room air conditioners operable in normal and extreme climatic conditions with optimized efficiency mode comprising of: an insulated box chiller (B) with louvers, the insulated box being mounted on a window air conditioner; a hinge (C) allowing partial opening of the cabinet at angles up to 180° (120 and 130); an additional lid (A) opening upwards to accommodate an ice box compartment (210) or a tubular grille storing a liquid; an additional outlet (D) consisting of a small grilled aperture; an electronic control panel (E) adaptable with various programme modes indicating different temperatures of the cabinet and controlling the variable opening of the cabinet according to temperature to be maintained in a room; and a means to maintain opening angles of louvers proportional to the angle of the cabinet door to operate the air-conditioning device in a refrigerating, heating or air-conditioning mode facilitating heat exchange between ice tray, cooled stored matter in the cabinet and air entering the conditioner and air of the room.

18 Claims, 4 Drawing Sheets

210

220

410

420

430

COMPACT GRILLE CABINET FOR ROOM AIR-CONDITIONERS

FIELD OF THE INVENTION

The present invention relates to the fields of air-conditioning, refrigeration with related control equipments adaptable in normal and extreme climate conditions with optimized efficiency mode of energy and heat exchange utilization for room cooling and warming.

BACKGROUND AND PRIOR ART

Electric air-conditioners and refrigerators are well known devices. These have three main parts—a compressor, a condenser and an evaporator. A liquid refrigerant is passed through the evaporator and the condenser in turns, via the compressor. As the liquid evaporates it exchanges heat from the air around it. The evaporated liquid is condensed again. This cycle is repeated till the desired temperature inside is reached at which a thermostat may keep the cycles suspended till a different temperature is reached again when the cycles are repeated all over again. However, in cold climates the flow of liquid may be reversed to heat the room.

Ice cooled room coolers are also known in which ice is put in a chamber provided, for exchanging heat with the ambient air. The limitation of such devices is that ice has to be brought in from outside in the machine and cooling effectiveness tapers down with the ice melting and the water acquiring higher temperature.

LU MINGHUI in CN 1594992 has proposed in indoor set of cabinet air-conditioner with closed refrigerating chamber. This has limited application, as it cannot be retrofitted or utilized in existing air-conditioning equipment e.g. conventional models mounted on the walls or ceilings. It will have disadvantages of consuming more space and being costlier.

Various drink-cooling holders have been disclosed for being used in cars, e.g. U.S. Pat. Nos. 6,560,983, 5,697,587 and 5,697,587.

The major drawback of the prior arts is that there is nothing that teaches how to effectively utilize a new grille of a conventional room air-conditioner also as a refrigeration/heating cabinet for not only storage of objects but also for improving the performance of the air-conditioner in extreme conditions, which the present invention does, as will be explained below.

BRIEF DESCRIPTION OF THE INVENTION

The present invention is based on a new improved design of the grille of a room air-conditioner. The grille has an insulated cabinet mounted on top of it, to be utilized more-or-less as a refrigerator. The said cabinet can have spaces to store liquids e.g. water etc. The cabinet can be closed fully for maximum cooling of the cabinet or can be partially closed for partial cooling of the cabinet as well as the room.

When opened fully, the cabinet may allow the unit to function fully as a room air-conditioner. In one embodiment, the cabinet may help cool the room faster by allowing the cold air to be circulated in the room to pass through it's ice faster chamber in which water was frozen into ice at an earlier time e.g. when the room was not in use. In an example embodiment, an electronic control panel is provided to maintain separate temperatures set for the cabinet and the room in a optimum manner, e.g. −1° C. in the cabinet and 20° C. in the room. To achieve this the electronic controller in addition to thermostats may also utilize the variable opening positions of the cabinet for faster cooling of the room to a desired temperature, by exchanging heat with the preformed ice in the cabinet, as mentioned earlier.

DETAILED DESCRIPTION WITH REFERENCE TO DRAWINGS

Figure 1:
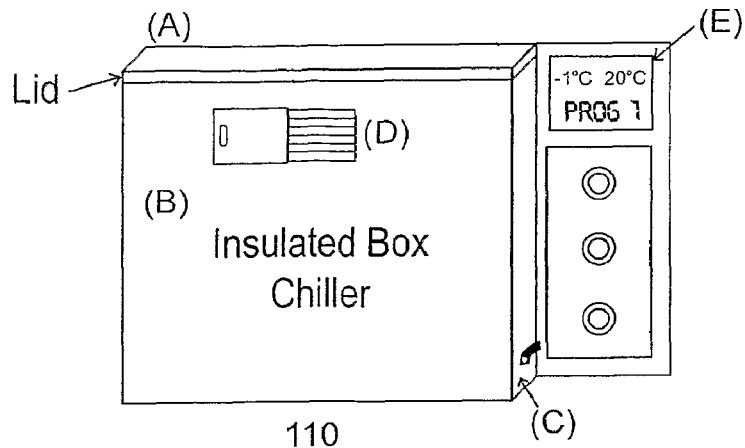
FIG. 1 shows an example of the improved grille cabinet mounted on a conventional window air-conditioner, from different angles.
Figure 1:
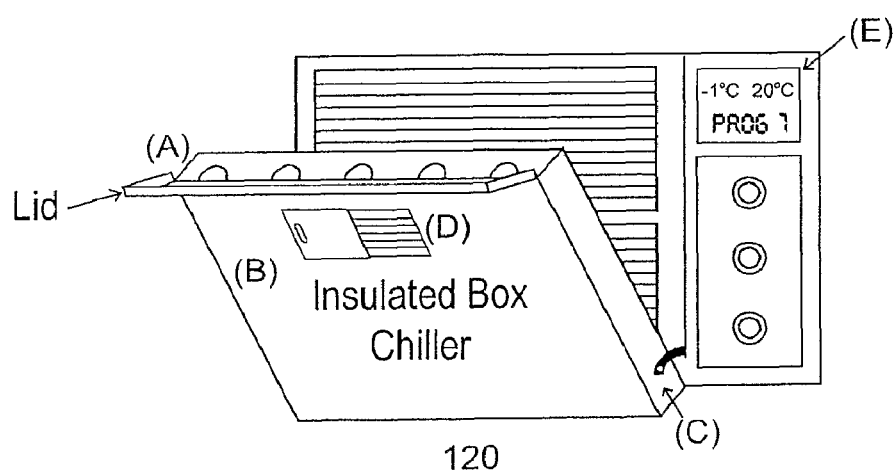
Figure 1:
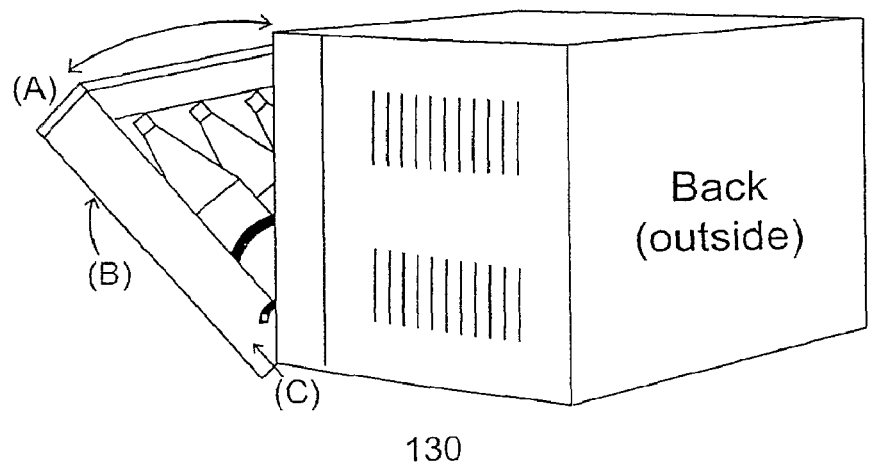

As per FIG. 1, an insulated box chiller is provided on a new improved grille comprising louvers operable to provide opening at various angles, in a conventional window air-conditioner. The cabinet is shown in closed position at 110 and in partially open position at 120 and 130. The insulated box B is mounted on the window air-conditioner with a hinge C. It has an additional lid A, which opens upwards as shown in 120. A hinge C allows partial opening of the cabinet at different angles say 30, 45, 60, 90 and 180°. The opening may be manual or motorized and automated electrically. Apart from the conventional air inlet and outlet arrangements as shown in the window air-conditioner, an additional outlet is provided to keep the room ventilated by partially channeling the conditioned air. An additional outlet at D comprises a small grilled aperture with a closing option with a sliding door. Alternatively, there may be adjustable louvers. This provides an option to allow some cold air to escape in the room, even when the cabinet is closed upright as shown in 110. An electronic control panel is provided as shown at E. The panel may show different temperatures of the cabinet and the room shown as −1 and 20° C. for example. It may also show various program modes selectable by the users through knobs or switches operable through a touch pad.

Figure 2:
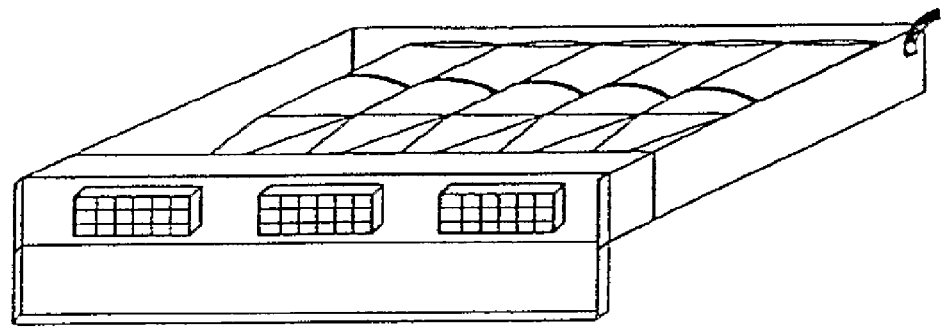
FIG. 2 shows the example grille cabinet in a dismantled position.
Figure 2:
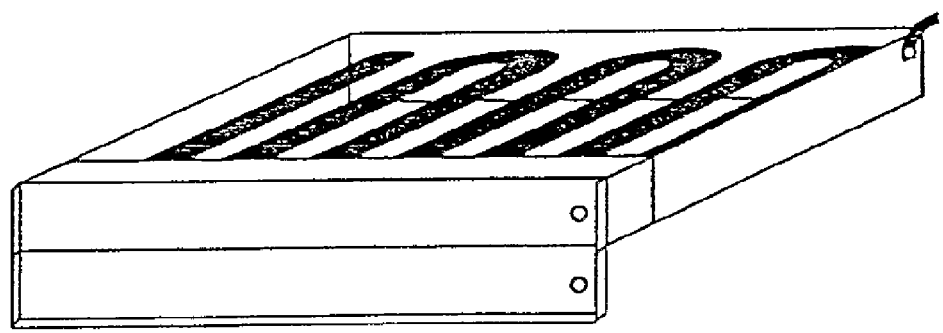
Figure 4:
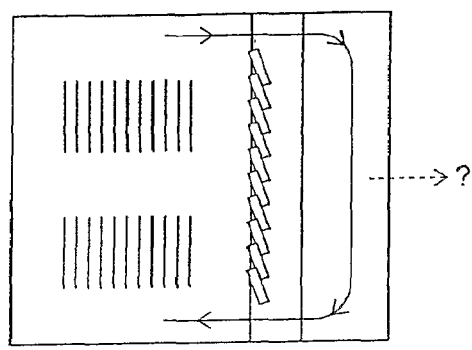
FIG. 4 shows variable opening angles of louvers in relation to the opening angle of the cabinet and the resulting airflows.
Figure 4:
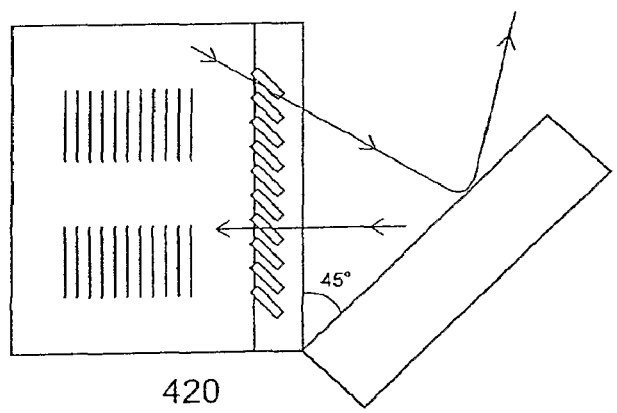
Figure 4:
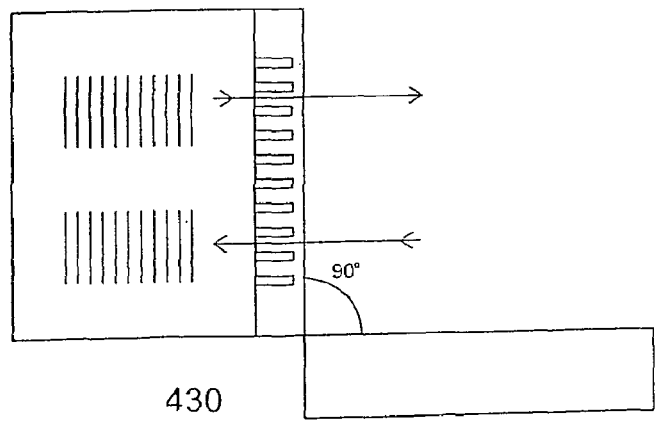

FIG. 2 shows the insulated grille cabinet in dismantled condition. An icebox compartment may be provided as shown, with a separate lid (A) opening upwards as shown at 210. In one embodiment, the cabinet grille can instead have a tubular reservoir coil as shown at 220. Alternatively it could be a tubular grille, which has the capacity to store a liquid, with an inlet provided. A safety valve is provided on the inlet seal or separately, if the liquid in the tube is desired to be heated. The grille cabinet is made to size of the air-conditioner and is fitted with the help of hinges as explained above. Though this grille is shown for example for being used in window based wall mounted air-conditioners, opening on a vertical axis as shown in FIGS. 1 and 4, the same can be easily applied for making a suitable grille for different types of air-conditioner like those paced on the floor or opening sideways etc. The tubular reservoir arrangement can be utilized for ceiling mounted outlets, to act as a buffer as will be explained.

Figure 3:
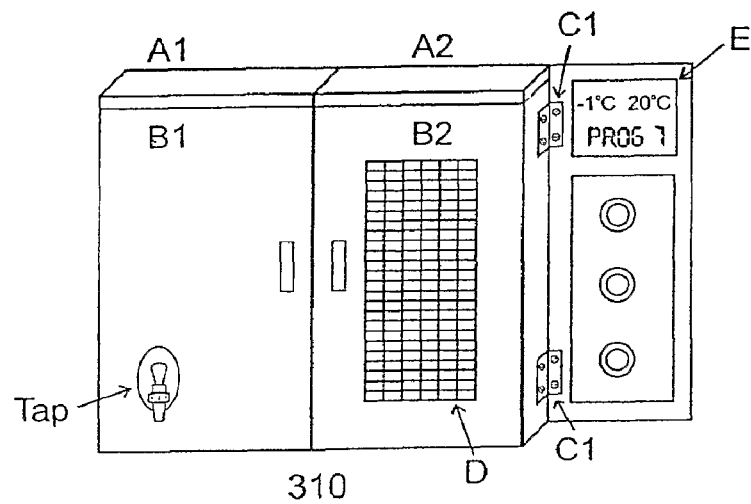
FIG. 3 shows an example grille cabinet in a different orientation i.e. opening sideways.
Figure 3:
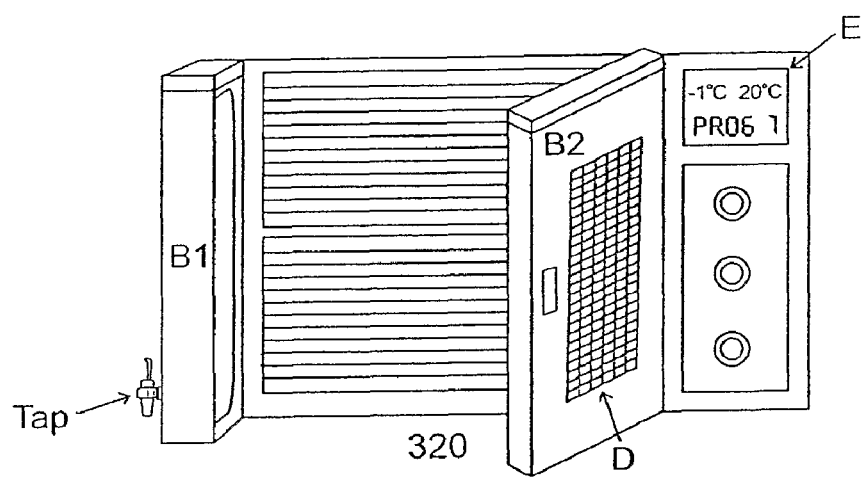
Figure 3:
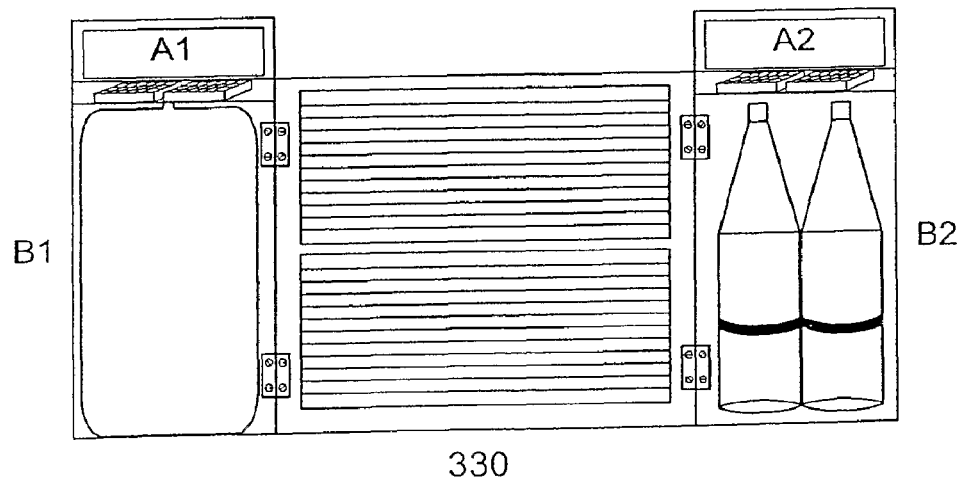

FIG. 3 shows a different double door arrangement of the grille cabinet opening sideways. The insulated cabinet doors B1 and B2 are mounted on a conventional window air-conditioner. These are mounted with the help of hinges e.g. B2 is mounted with C1 and C2 as shown. One of the doors e.g. B1 has a container with tap E as shown. Another door B2 e.g. has an additional grille D, which can be flipped open or kept closed even when both the doors viz.

B1 and B2 are closed, to keep the room ventilated or to insulate the cabinet to the maximum extent, respectively. One of the doors e.g. B1 has an inbuilt reservoir for storing a liquid e.g. water, with a tap arrangement on the outside, as shown. Apart from the conventional air inlet and outlet arrangements as shown in the window air-conditioner, an additional outlet D is provided to keep the room ventilated by partially channeling the conditioned air, optionally. Additional lids A1 and A2 is provided opening upwards, with a separate compartment for ice as shown at 330. At 310 the cabinet doors are shown in closed condition, at 320 in partially open and at 330 in fully open conditions.

The opening of the door type cabinet may be manual or motorized and automated electrically to open at various angles depending on the optimization of temperatures required to be maintained in the cabinet and in the room. In the case of a single door cabinet as shown in FIG. 1, a push-to-pull type door arrangement as is generally used in cassette tape recording decks. It can be configured for manual or electronic operations, whereby a soft and gradual opening of the cabinet is provided at various angles, utilizing gravitational tilt triggered by a lever when the door is pushed back gently from a previously locked position. If a double door arrangement is required, the operation of both the door may be coupled.

The air inlet and outlet of the air-conditioner have louvers that close down when the cabinet is closed, leaving smaller apertures for circulating the cold air as in a refrigerator. The louvers may be hollow or filled with a heat resistant material e.g. polyurethane foam to make the cabinet insulated form inside, when closed. The louvers can be controlled through a spine, with the help of lever attached to the cabinet door in a way that the angle at which those positions open are proportional to the angle at which cabinet door is positioned, as shown in FIG. 4. For example at 420 the cabinet door is open at a 45° angle, leaving the louvers at 135° on the same axis.

However at 430, the louvers are at right angle as is the cabinet. When the cabinet is closed as shown at 410, the louvers are also closed, leaving only small apertures and providing an insulated inner lining of the cabinet ready to be used as a refrigerator or a heater. The apertures can be a two part air outlet and inlet or two separate apertures for inlet and outlet of the air as shown. An optional adjustable grille on the cabinet as shown in FIGS. 1 and 3 at D will or will not allow some conditioned air to escape in the room, as shown through an arrow in 410. Likewise, the angle of the louvers can be manipulated on a horizontal axis in relation to the angle of each door, in case the cabinet opens sideways as in FIG. 3. This feature of the invention also operates the device to throw out the conditioned air at a desired angle to facilitate heat exchange as shown e.g. in 420 the air is directed out at an angle of about 135° to touch the ice tray in the cabinet that is opened at 45° on the same axis, before being dispersed in the room. This way the dispersed air will exchange some further heat with the ice due to the temperature difference.

Likewise, the air entering the air-conditioner will also come in contact with the stored and cooled matter and exchange heat.

The inside of insulated grille cabinet may have storage space to store objects. Although bottles and ice trays are shown for example in FIG. 2, the storage space may comprise various options to store various matter, e.g. a coolant with a very high boiling point or a very low freezing point in a tubular reservoir as shown at 220 etc., or a cabinet to store medicines etc. In case of heater model, there may be a boiler with a safety valve, utilized as a hot water dispenser for making coffee etc. The storage space may be in the form of any pre-formed container with an opening in which a suitable matter e.g. a coolant may be stored and recharged from time to time.

In one of the embodiments, the refrigeration cabinet can be used to cool a coolant e.g. cool water into ice, when the load of air-conditioning is less e.g. in the night when the temperature is fallen or at a time when the room is not in use. The said ice can then be utilized as a super-coolant to rapidly cool the room by exchanging heat with it in addition to the conventional heat exchange process with the refrigerant in the air-conditioning unit. This mechanism can be very useful in very hot and arid areas like deserts where a conventional air-conditioner may not be to achieve the same level of cooling so fast. It may be also useful in erratic power supply e.g. in a periodic blackout zone, when the air-conditioner may still run on 'Fan' mode on a battery inverter or low capacity power generator, yet being able to cool the air by exchanging heat with the coolant. In one embodiment, such battery with a charger may be provided in-built in the machine. This may be useful in a situation where very fast room cooling is required e.g. in a hotel room at a time when the guest checks in. Passing of cool air through a chiller in which ice has been frozen in advance may also provide some humidity in the air, which may be desirable in dry conditions. However, if the additional humidity is absolutely undesirable, e.g. in a humid zone, the chiller is provided with a heat sensitive insulated e.g. a metal foil, through which the air will pass without physically coming in contact with the chilled matter. A coolant other than water, which has lower freezing point may be provided for using the chiller as above i.e. as an additional cooling device, for taking care of very hot weather conditions. However, a heating device may be similarly provided, for use in very cold temperatures e.g. in polar region. In that case the cabinet may be used to store objects in hot conditions e.g. water at 60° C. In this case, the air-conditioning unit may be used as a heat pump by reversing the flow of liquid using a valve, as is conventionally done. A liquid which has a boiling point higher than water may be utilized to store heat more effectively for a later use e.g. during night time when drop in temperature is more or in erratic power supply conditions, as mentioned earlier.

In an embodiment, a controller may be provided for controlling a temperature of the cabinet and a temperature of the room. For example, the cabinet temperature may be set at −1° C. and the room temperature at 20° C., through two thermostat devices connected to the controller. The controller can then control the working of the air-conditioner in response to the said temperatures in such a way that the air-conditioning unit keeps on performing it's cycles till both the temperatures are achieved. As an example let the room temperature as set at 20° is achieved but the cabinet temperature is achieved only at 5° C. and not −1° C. as set in the example, in that case the controller will let the air-conditioning cycles keep on working. As a result the room temperature will fall below 20° C. In that case, the cabinet is partially open and the user is prompted by an electronic signal e.g. a light or sound, to close the cabinet to preserve cooling in it, as the room already has achieved the desired cooling. However, this function can also be automated by microprocessor logic, implemented through a program embedded in a memory on a logic card to control a motorized opening. Such program logic can control an electronically automated cabinet opening mechanism in which the variable opening is kept at a level to maintain the room temperature at a certain level say 20° C. in the example. A further programme in the logic is provided not to let the temperature of the cabinet fall below a certain level, say 10° C., before providing a variable opening angle for cooling the room. This feature will be useful in conditions where perishable is stored in the cabinet, e.g. medicines. Various program algorithms can be designed to optimize the temperatures of the two viz. the cabinet and the room. There may be user selectable modes in which a different logic may be provided, e.g. first cool the room to the desired temperature without any constraint about maintaining any lower temperature in the cabinet. In this case the controller is adapted to operate the variable cabinet opening to an angle in which the room will be cooled the fastest and the most. For example, when additional cooling is to be achieved by letting the cool air to pass through the chiller cabinet and exchange some heat in that process, as explained earlier, the grille cabinet is opened at 45°. However when the cabinet does not have previously frozen or chilled item e.g. ice or cold water, the opening is to be at 90° plus to allow the cool air to escape in the room. In yet another variation when the room and the cabinet is to be simultaneously cooled to say 10° and 20° respectively, the opening of the cabinet is maintained at 30°. The temperatures of the cabinet and the room, the angle of opening of the cabinet and various program features is displayed electronically on a control panel operable by the user in various modes.

In another embodiment, the microprocessor-based controller is provided, which has various program features in built and optionally selectable by the user, to optimize the cooling of the cabinet and the room as desired, as explained above. The said programmable features can employ various challenge-response logics. For example, one of the selections is to always maintain the cabinet temperature at say 10°, when the unit is switched on and maintain the room temperature as selected. This kind of a selection is suitable in a situation for example in hotel room, where a welcome drink is to be stored in the cabinet. Such a unit can effectively function as a room air-conditioner-cum-chiller.

In yet another exemplary embodiment, the cabinet is used for cooling while the air-conditioning is to heat the room air. This is achieved by closing the insulated cabinet fully and allowing the cooled air to be withheld within the cabinet whereas the room air will be sucked in through a separate inlet to take it to a heat exchanger contiguous to the hot coils to gain heat and then return to the room. In extreme cold climates, it is desirable to have both, the cabinet and the room air to be heated and this can be achieved by utilizing the unit as a heat pump by reversing the flow of liquid.

Apart from the two-in-one convenience of utilizing the disclosed invention for storing objects as well as air-conditioning the room at desirable temperatures, it also provides an effective means for storing the heat energy for a delayed and concentrated use. This adaptation is very useful for industrial application especially in harsh climatic zones.

The invention is also useful to reduce the pressure on resources by achieving multiple conveniences with a single device, in an optimum way. For example, in an office or a budget hotel room an air-conditioner utilizing the disclosed invention can also provide the facility to chill or heat a drink thereby obviating the need for a separate refrigerator/boiler.

In one embodiment, the grille cabinet is formed into an insulated tubular storage container as shown in FIG. 2B, somewhat resembling a radiator. In this a suitable liquid is to be stored and cooled or heated to preserve a temperature difference of very high degree from the ambient air temperature. Air-conditioners and heaters work on the principles of conductive heat transfer, which is proportional to the temperature difference between materials. If the room air temperature is at 30° C. and the cold coil through which such air is passed is at 0°, then there is a 30° temperature difference for cooling. In case of a heater the room air temperature may be 0° and the heat coil may be 60°, leading to a conductive heat transfer from the coil to the air. As air has low heat density, it is very difficult to preserve temperature difference between the room air and the ambient temperatures. In contrast, liquids have much higher heat density and so it will act as a very efficient reservoir of the temperature differences kept insulated for subsequent use as explained. These properties of the device can be further enhanced by choosing liquids based on the intended applications for various climatic conditions e.g. a liquid with lower freezing point or higher boiling point will provide better effectiveness for preserving negative or positive temperature differences for intensive cooling or heating applications respectively in say extreme summer and winter conditions. For example in one embodiment saline water and in another a coolant e.g. propylene glycol or ethylene glycol is used is maintain temperatures of $-20°$ and $150°$ C. respectively, to rapidly cool or heat the ambient temperature when required.

Due to very low heat density of air, the coldness or heat cannot be preserved effectively by cooling or heating the room for a long time utilizing a conventional air-conditioner or heater.

Moreover, an overly cooled or heated room will not be comfortable. Likewise, an over-cooled or over-heated room will not provide any solution like the present invention does for providing a richly dense reservoir of temperature difference which can be gradually drawn from in extreme conditions like an erratic power zone or in case of a critical use like a medical facility or computer server room where temperature can not be allowed to go below or above a certain range. The invention provides an effective solution in such applications, for minimizing downtime and facilitating intervention e.g. in case of a power breakdown the temperature can be still maintained with a fan blowing the air through the reservoir in the cabinet, running on a in built battery while the power supply is fixed. In the same manner, in an extreme whether condition e.g. in hot summer or in freezing winter conditions, the disclosed device will be more effective in providing a dense storage of temperature difference which can be used as a buffer to gradually provide additional effectiveness to a conventional air-conditioning machine. For example, instead of cooling a bedroom in an extremely hot summer throughout the day even when it is to be utilized during night time only, it will be much more effective to let the machine work with cabinet closed during day time to preserve cooling by freezing a liquid with a very low freezing point and then use it as a heat sink during night time, by partially opening the cabinet, say at an angle of 45°, by letting the conventionally air-conditioned air pass through the frozen reserve and in that process loose more heat. The disclosed device will be also more effective in evening out the load on the machine in case there is a large difference in temperatures during different hours. For example in a place where day temperature is very hot whereas the night temperature is moderate requiring little air-conditioning, the disclosed device will help preserve machine's efficiency by freezing the liquid stored in the insulated cabinet which may be kept closed in the night, so that the same may be used for exchanging heat in the day time, as explained.

A frost-fee device is provided to be added like in conventional frost-free refrigerators, with the help of a timer, heater and temperature sensor. Every 6 hours or so, the timer may activate the heater coil to melt frost. The temperature sensor cuts off the heater when a suitable temperature, e.g. 0° C. is crossed.

Although wall type air-conditioner has been shown for example, the invention can be effectively utilized for other types e.g. floor mounted climatisers. In one embodiment, the heat sink/reservoir application, i.e. the function of preserving and conducting a high degree of temperature difference through a liquid kept frozen or heated as a buffer, as explained in the last paragraph is applied in ceiling mounted air-conditioners also. In extremely critical application, there is a further provision of bringing in the heat sink/reservoir matter e.g. ice or hot water from outside, for storage in the device, for temporarily aiding the machine capacity, e.g. in a breakdown when the machine is running on fan mode.

The device as per the disclosed invention can be factory made as a package or existing air-conditioners can be retrofitted with the new grille cabinet and other accessories according to various embodiments and adaptations for different optimized applications as defined in the encampused appended claims.

I claim:

1. A compact grille cabinet for room air conditioners operable in normal and extreme climatic conditions with optimized efficiency mode comprising of:
    an insulated box (B) with louvers, the insulated box being mounted on a window air conditioner;
    a hinge (c) allowing partial opening of the cabinet at angles up to 180° (120 & 130);
    an additional lid (A) opening upwards to accommodate an ice box compartment (210) or a tubular grille storing a liquid;
    an additional outlet (D) consisting of a small grilled aperture;
    an electronic control panel (E) adaptable with various programme modes indicating different temperatures of the cabinet and controlling the variable opening of the cabinet according to temperature to be maintained in a room; and
    a means to maintain opening angles of louvers inversely proportional to the angle of the cabinet door to operate the air-conditioning device in a refrigerating, or air-conditioning or heating mode facilitating heat exchange between the frozen or cooled or heated stored matter in the cabinet and the air entering the conditioner and the room.

2. The compact grille cabinet of claim-1, wherein the additional outlet (D) operates with a closing option with a sliding door or with adjustable louvers to allow some air to escape in the room even when the cabinet is closed upright (110).

3. The compact grille cabinet of claim-1, wherein the panel (E) shows different temperatures of the cabinet and the room.

4. The compact grille cabinet of claim-1, wherein the cabinet can have a tubular reservoir coil (220) instead of a tubular grille.

5. The grille cabinet of claim 4 further comprising a safety valve provided on the inlet seal or separately, to act as a safety valve when the liquid in the tube is heated.

6. The compact grille cabinet of claim-1, wherein the grille can be used as window based wall mounted air conditioner, opening on a vertical axis or opening sideways or placed on the floor.

7. The compact grille cabinet of claim-1, wherein the tubular reservoir (210) arrangement can be adapted for ceiling mounted outlets to act as a buffer.

8. The compact grille cabinet of claim-1, wherein the grille cabinet is of double door arrangement (B1, B2) opening sideways through hinges (C1, C2).

9. The compact grille cabinet of claim-8, wherein one of the door (B1) has an inbuilt reservoir for storing liquid with a tap (E) and another door (B2) has an additional grille (D), which can be flipped open or kept closed even when both the doors are closed to keep room ventilated or to insulate the cabinet to the maximum extent respectively.

10. The compact grille cabinet of claims 1 or 8, wherein additional lids A1 and A2 are provided opening outwards and the additional outlet (D) is provided to keep the room ventilated by partially channeling the conditioned air optionally.

11. The compact grille cabinet of claim-1, wherein the doors of the cabinet are operated mechanically to provide opening of the doors at various angles utilizing gravitational tilt triggered by a lever when the door is pushed back gently from a previous locked position depending on the optimized temperatures required to be maintained in the cabinet and the room.

12. The grille cabinet of claim 11 wherein its doors are operable manually or electrically.

13. The compact grille cabinet of claim-1, wherein the louvers may be hollow or filled with heat resistant material such as polyurethane foam to make the cabinet insulated from inside, when closed.

14. The compact grille cabinet of claims 1 or 13, wherein the louvers are controlled through a spine with the help of lever attached to the cabinet door.

15. A process of room cooling or heating in normal and extreme climatic conditions with optimized efficiency mode comprising the steps of:
    storing and cooling or heating a matter in an insulated cabinet mounted on electric air conditioner grille having louvers and insulated box;
    circulating the air through a contact with such stored and cooled or heated matter, for heat exchange between the said matter and the air entering the conditioner and air of the room.

16. An electronic controller for controlling the temperature of the cabinet of claim-1 and the temperature of a room by controlling the working of an air conditioner to maintain required temperature automatically operated via a logic circuit through a logic card to control motorized variable opening of the cabinet door.

17. The controller of claim 16, having a further programme in the logic maintaining a minimum temperature of the cabinet below a preset level such as 1° C.

18. The controller of claims 16 or 17, having various programme features in built and optionally selectable by the user, to optimize the cooling or warming of the cabinet and room.

* * * * *